United States Patent
Brokenshire et al.

(10) Patent No.: US 6,243,097 B1
(45) Date of Patent: Jun. 5, 2001

(54) BOUNDING VOLUME FOR 3D GRAPHIC PRIMITIVES

(75) Inventors: Daniel Alan Brokenshire, Round Rock; Suzanne Carol Deffeyes, Austin; Gordon Clyde Fossum, Austin; Barry L. Minor, Austin, all of TX (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/210,136

(22) Filed: Dec. 10, 1998

(51) Int. Cl.[7] ................................................. G06T 15/40
(52) U.S. Cl. ............................................................ 345/421
(58) Field of Search ................................... 345/419, 420, 345/421, 427, 434, 437, 438

(56) References Cited

U.S. PATENT DOCUMENTS

| | | | |
|---|---|---|---|
| 5,574,835 | * 11/1996 | Duluk, Jr. et al. | 395/121 |
| 5,588,098 | * 12/1996 | Chen et al. | 395/137 |
| 5,757,321 | * 5/1998 | Billyard | 345/434 |

* cited by examiner

*Primary Examiner*—Mark Zimmerman
*Assistant Examiner*—Enrique L Santiago
(74) *Attorney, Agent, or Firm*—Joseph P. Lally

(57) ABSTRACT

A method of and system for testing a graphic primitive for trivial acceptance or rejection. An initial bounding volume, such as a rectangular parallelepiped, is defined by the graphic primitive's maximum and minimum x, y, and z coordinates in an initial coordinate system. A first bounding volume is then defined by the graphic primitive's maximum and minimum x', y', and z' coordinates in a first coordinate system, where the first coordinate system is transformed with respect to the initial coordinate system. Preferably this transformation comprises a 45° rotation about a common axis such as the z-axis. The initial bounding volume and the first bounding volume are then intersected to form a modified bounding volume. The vertices of the modified bounding volume are then available for use in determining whether the graphic primitive may be trivially rejected or accepted within a specified viewing volume. In one embodiment, the method further includes defining and using a second modified bounding volume by intersecting the initial bounding volume with a second bounding volume defined by the graphic primitive's maximum and minimum x", y", and z" values in a second coordinate system. The second coordinate system is determined by applying a second transformation, such as a 45° rotation about a common y-axis, with respect to the initial coordinate system. Still further, the invention may include defining and using a third modified bounding volume by intersecting the initial bounding volume with a third bounding volume defined by the graphic primitive's maximum and minimum x‴, y‴, and z‴ values in a third coordinate system determined by applying a third transformation, such as a 45° rotation about a common x-axis with respect to the initial coordinates system.

20 Claims, 3 Drawing Sheets

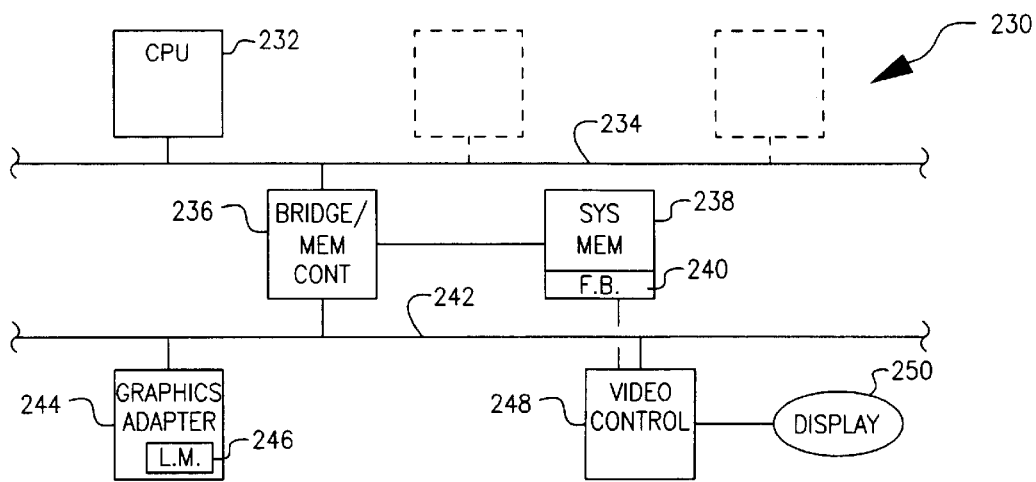
FIG.13
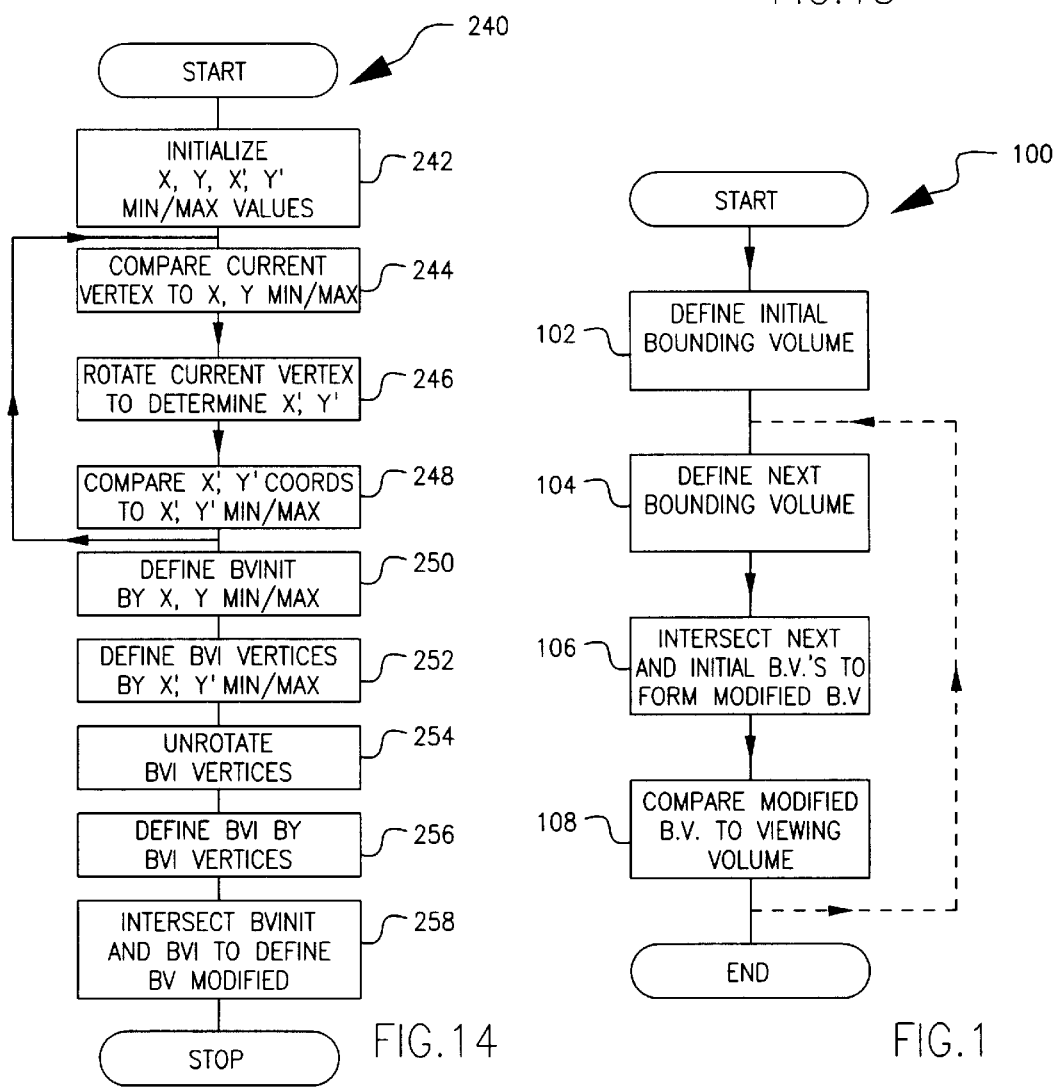
FIG.14
FIG.1

$x' = y \cos(\alpha) + x \sin(\alpha)$
$y' = x \cos(\alpha) - y \sin(\alpha)$

BOUNDING VOLUME FOR 3D GRAPHIC PRIMITIVES

BACKGROUND

1. Field of the Present Invention

The present invention generally relates to 3D graphics and more particularly to a system and method for bounding 3D graphic primitives to reduce the probability of failing to detect a trivial accept or trivial reject without significantly increasing the complexity of the bounding volume.

2. History of Related Art

Graphics display subsystems are almost universally encountered in microprocessor based computer systems to facilitate a variety of graphics tasks and applications. Graphics processors, graphics adapters, and a variety of similarly designed computer products provide specialized hardware to speed the execution of graphics instructions and rendering of graphic images. These processors and adapters typically include, for example, circuitry optimized for translating, rotating, and scaling 3D graphic images. In a typical application, a graphical image that is displayed on a display terminal or other output device is composed of one or more graphic primitives. For purposes of this disclosure, a graphic primitive may be thought of as one or more points, lines, or polygons that are associated with one another, such as by being connected to one another. Typically, the displayed image is generated by creating one or more graphic primitives, assigning various attributes to the graphic primitives, defining a viewing point and a viewing volume, determining which of the graphic primitives are within the defined viewing volume, and rendering those graphic primitives as they would appear from the viewing point. This process can require a tremendous amount of computing power to keep pace with the ever increasingly complex graphics applications that are commercially available. Accordingly, designers of graphics systems and graphics applications are continuously seeking cost effective means for improving the efficiency at which graphic images are rendered and displayed.

A significant portion of any graphic application is typically consumed determining what portions, if any, of a graphic primitive are within the viewing volume. If a graphic primitive is only partially within a specified viewing volume, a clipping process must be performed on the graphic primitive to eliminate the portion of the graphic primitive exterior to the viewing volume. If the graphic primitive is completely exterior to the viewing volume, further consideration of the primitive is unnecessary. If the graphic primitive is completely within the viewing volume, the rendering process may be initiated without performing any clipping. Thus, it will be appreciated by those experienced in computer graphics that determining a graphic primitive's spatial relationship to a viewing volume provides an opportunity to eliminate a potentially significant amount of processing. Unfortunately, the process of determining whether a graphic primitive is within a specified viewing volume is typically either undesirably time consuming or undesirably inaccurate. If a graphic primitive is thought of as a collection of vertices, an accurate but potentially time consuming method of determining whether the primitive is within a viewing volume includes simply determining whether each vertex of the primitive is within the viewing volume. For extremely simple graphic primitives comprised of relatively few vertices, such a direct method is preferred for its simplicity and accuracy. This direct method, however, quickly becomes burdensome as the complexity of the primitive increases. If, for example, the graphic primitive includes thousands of vertices, the direct approach will require thousand of comparisons, as each vertex is compared to the boundaries of the viewing volume using well known line clipping techniques.

The time required to complete the comparison process can be made essentially independent of the complexity of the graphic primitive if the primitive is approximated by a simple geometric shape referred to as a bounding volume that encloses the entire primitive. Regardless of the complexity of the graphic primitive that it encloses, the bounding volume is defined by a relatively few vertices. In a common application, for example, the bounding volume is the smallest rectangular parallelepiped that completely encloses the primitive. Regardless of the complexity of the primitive, this bounding volume has only eight vertices. Accordingly, a routine can quickly determine if the bounding volume is within the viewing volume by comparing just eight points to the boundaries of the viewing volume. The problem with such a simplistic bounding volume is the accuracy of the comparison results. If the graphic primitive is irregularly shaped, the simple bounding volume does a poor job of approximating the graphic primitive's shape and use of the simple bounding volume to determine whether the graphic primitive is within a viewing volume may result in a failure to detect a trivial accept or trivially reject condition. The penalty for failing to detect such trivial accept/reject conditions can be significant, especially in applications that include complex graphic primitives. Accordingly it is highly desirable to introduce a method and system for reducing the probability of failing to detect a trivial accept/reject condition without significantly impacting the performance of the trivial accept/reject process.

SUMMARY OF THE INVENTION

The problems identified above are in large part addressed by a method and system for creating and utilizing a modified bounding volume that strikes a balance between the accuracy of testing for trivial acceptance/rejection by checking each vertex of a graphic primitive and the speed of determining trivial acceptance/rejection by utilizing a rectangular parallelepiped bounding volume. By marginally increasing the complexity of the bounding volume a significant improvement is achieved in reducing the probability of failing to detect a trivial acceptance or rejection of a graphic primitive when constructing a particular graphic image.

Broad speaking, the present invention contemplates a method of bounding a graphic primitive. An initial bounding volume, such as a rectangular parallelepiped, is defined by the graphic primitive's maximum and minimum x, y, and z coordinates in an initial coordinate system. A first bounding volume is then defined by the graphic primitive's maximum and minimum x', y', and z' coordinates in a first coordinate system, where the first coordinate system is transformed with respect to the initial coordinate system. Preferably this transformation comprises a 45° rotation about a common axis shared by the initial and first coordinate systems. The initial bounding volume and the first bounding volume are then intersected to form a modified bounding volume that provides a more accurate approximation of the graphic primitive than either the initial bounding volume or the first bounding volume. The vertices of the modified bounding volume are then available for use in determining whether the graphic primitive may be trivially rejected or accepted within a specified viewing volume.

Preferably, the process of defining the first bounding volume includes applying the first transformation to each vertex of the graphic primitive to produce a transformed graphic primitive. A transformed bounding volume is then defined by maximum and minimum x, y, and z values of the transformed graphic primitive in the initial coordinate system. The transformed bounding volume is comprised of a plurality of transformed vertices. An inverse of the first transformation is then applied to each of the transformed vertices to transform the first bounding volume to a common coordinate system with the initial bounding volume. In one embodiment, the method further includes defining a second modified bounding volume by intersecting the initial bounding volume with a second bounding volume defined by the graphic primitive's maximum and minimum x", y", and z" values in a second coordinate system. The second coordinate system is determined by applying a second transformation, such as a 45° rotation about a common y-axis, with respect to the initial coordinate system. The second modified bounding volume may then be used, in addition to the first modified bounding volume, for trivial acceptance/rejection testing of the graphic primitive. Still further, the invention may include defining a third modified bounding volume by intersecting the initial bounding volume with a third bounding volume defined by the graphic primitive's maximum and minimum x''', y''', and z''' values in a third coordinate system that is determined by applying a third transformation, such as a 45° rotation about a common x-axis, to the initial coordinates system. Like the first and second modified bounding volumes, the third bounding volume may by used for purposes of trivially accepting or rejecting the graphic primitive with respect to a specified viewing volume.

The present invention further contemplates a graphic display system that includes a system memory, preferably including a representation of a graphic primitive in a frame buffer portion of the memory, a display processor configured to execute graphics instructions to modify contents of a frame buffer, a display device, and a video controller capable of accessing the frame buffer and adapted to generate a screen image on the display device based on the frame buffer contents. The graphics instructions preferably include instructions for trivially rejecting or accepting the graphic primitive with respect to a specified viewing volume by defining an initial bounding volume by the graphic primitive's maximum and minimum x, y, and z coordinates in an initial coordinate system, defining a first bounding volume by the graphic primitive's maximum and minimum x', y', and z' coordinates in a first coordinate system, where the first coordinate system is determined by applying a first transformation, such as a 45° rotation about a common z-axis, to the initial coordinate system, and intersecting the initial bounding volume and the first bounding volume to form a modified bounding volume. The graphic primitive's relationship to a predetermined viewing volume is then determined by determining the modified bounding volume's relationship to the viewing volume, wherein the graphic primitive is trivially accepted if the modified bounding volume is within the viewing volume and the graphic primitive is trivially rejected if the modified bounding volume is exterior to the viewing volume. The instructions may further include defining second and possibly third and subsequent modified bounding volumes by intersecting the initial bounding volumes with second and possibly third and subsequent bounding volumes defined by maximum and minimum graphic primitive values in second, third, and possibly additional coordinate systems.

The present invention still further contemplates a suitable storage medium, such as a system memory, a local memory of a graphics adapter, a hard or floppy disk, a CD ROM, or a compact flash card, that is configured with computer instructions for defining an initial bounding volume by a graphic primitive's maximum and minimum x, y, and z coordinates in an initial coordinate system, defining a first bounding volume by the graphic primitive's maximum and minimum x', y', and z' coordinates in a first coordinate system, where the first coordinate system is determined by applying a first transformation to the initial coordinate system, intersecting the initial bounding volume and the first bounding volume to form a modified bounding volume, and determining the graphic primitive's relationship to a predetermined viewing volume by determining the modified bounding volume's relationship to the viewing volume.

BRIEF DESCRIPTION OF THE DRAWINGS

Other objects and advantages of the invention will become apparent upon reading the following detailed description and upon reference to the accompanying drawings in which:

FIG. 1 is a flow diagram of a method for bounding a graphic primitive according to the invention;

FIG. 13 is a simplified block diagram of a graphics display system according to the invention;

FIG. 14 is a flow diagram of a method of generating a first bounding volume according to the invention.

Figure 2:
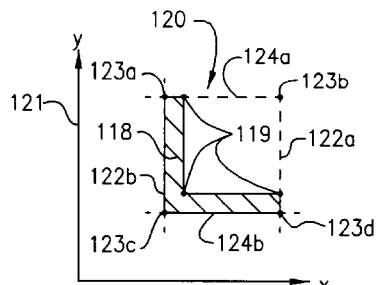
FIG. 2 is a cross sectional view of a graphic primitive and its associated bounding volume relative to an initial coordinate system.

While the invention is susceptible to various modifications and alternative forms, specific embodiments thereof are shown by way of example in the drawings and will herein be described in detail. It should be understood, however, that the drawings and detailed description presented herein are not intended to limit the invention to the particular embodiment disclosed, but on the contrary, the intention is to cover all modifications, equivalents, and alternatives falling within the spirit and scope of the present invention as defined by the appended claims.

DETAILED DESCRIPTION OF A PREFERRED EMBODIMENT OF THE PRESENT INVENTION

Turning now to the drawings, FIG. 1 presents a flow diagram of a method 100 of determining whether a graphic primitive may be trivially accepted or rejected using a modified bounding volume according to the present invention. In step 102, an initial bounding volume is defined. Preferably, the initial bounding volume is comprised of the rectangular parallelepiped defined by the maximum and minimum x, y, and z values of the graphic primitive relative to an initial coordinate system. Steps 104 through 108 define a loop that may be iterated one or more times depending upon the embodiment. In step 104, a first bounding volume (or second bounding volume, third bounding volume, etc., corresponding to the loop iteration count) is defined. In the presently preferred embodiment, the first bounding volume is defined by the graphic primitive's maximum and minimum x', y', and z' coordinates relative to a first coordinate system. (A preferred method of defining the first bounding volume is described in greater detail below with respect to FIG. 14). The first coordinate system is transformed with respect to the initial coordinate system. In one embodiment, the first coordinate system is determined by applying a first transformation to the initial coordinate system. In a presently preferred embodiment, the first transformation includes rotating the initial coordinate system through an angle $\alpha$ about an axis, such as the z axis, of the initial coordinate system. In this embodiment, it will be appreciated that the first bounding volume, like the initial bounding volume, is a rectangular parallelepiped. Moreover, because the initial coordinate system and first coordinate system share a common axis, the initial and first bounding volumes share a common dimension. In the embodiment in which the initial and first coordinate systems share a common z-axis, for example, the z-dimension of the initial and first bounding volumes will be the same. The sharing of a common axis simplifies the process of defining a modified bounding volume as described herein.

A modified bounding volume according to the invention is produced by intersecting the initial bounding volume with the first bounding volume in step 106. Referring to FIGS. 2 through 5 momentarily, a visualization of method 100 is presented in two dimensions for the sake of clarity). FIG. 2 depicts a cross sectional view taken in the x-y plane of an initial coordinate system 121 at z=0 of a graphic primitive 118. Graphic primitive 118 includes a plurality of vertices 119. While primitive 118 as shown in FIG. 1 includes only six vertices 119, it will be readily appreciated that a more complex graphic primitive may include a substantially greater number of vertices. FIG. 2 further depicts a cross sectional view of an initial bounding volume 120. Initial bounding volume 120 includes vertices 123a, 123b, 123c, and 123d defined by a maximum x value 122a, a minimum x value 122b, a maximum y value 124a, and a minimum y value 124b. (Although not shown in the cross sectional view of FIG. 2, it will be appreciated that bounding volume 120 is further defined by maximum and minimum z values.) Maximum and minimum x and y values 122a, 122b, 124a, and 124b, are relative to first coordinate system 121 as shown.

Figure 3:
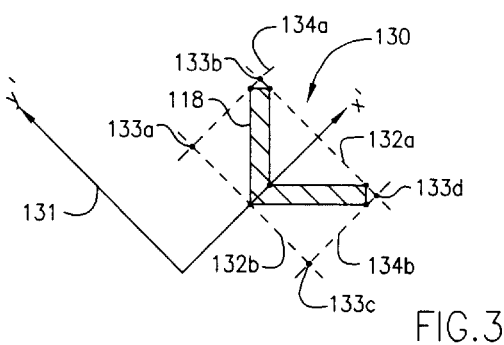
FIG. 3 is a cross sectional view of the graphic primitive of FIG. 2 and an associated bounding volume relative to a first coordinate system that is transformed from the initial coordinate system of FIG. 2.
Figure 5:
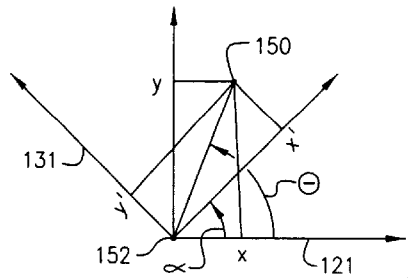
FIG. 5 is a diagram illustrating the relationship between an initial coordinate system and a first coordinate system that is rotated with respect to the initial coordinate system.

Turning to FIG. 3, a cross sectional view of a first bounding volume 130 of graphic primitive 118 is shown. First bounding volume 130 includes vertices 133a, 133b, 133c, and 133d defined by maximum and minimum x' values 132a and 132b and maximum and minimum y' values 134a and 134b relative to a first coordinate system 131. FIG. 5 depicts the relationship between initial coordinate system 121 and first coordinate system 131 in one embodiment of the invention. In this embodiment, initial coordinate system 121 and first coordinate system 131 share a common origin 152 and a common z-axis (not indicated in the cross sectional view). First coordinate system 131 is rotated with respect to initial coordinate system 121 about the common z-axis through an angle $\alpha$. FIG. 5 further depicts an exemplary vertex 150. The equations presented in FIG. 5 indicate the relationships between the x, y coordinates of vertex 150 relative to initial coordinate system 121 and the x', y' coordinates of vertex 150 relative to first coordinate system 131. These simple trigonometric relationships are utilized in the preferred method for determining the first bounding volume 130 described in greater detail below.

Figure 4:
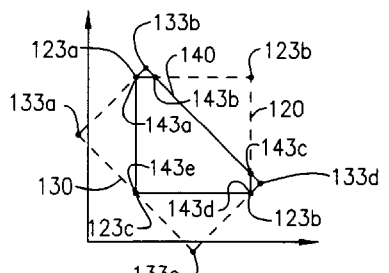
FIG. 4 is a cross sectional view of a modified bounding volume produced by intersecting the initial bounding volume of FIG. 2 and the first bounding volume of FIG. 3.

Turning now to FIG. 4, a cross sectional view of a first modified bounding volume 140 is presented. Modified bounding volume 140 includes vertices 143a, 143b, 143c, 143d, and 143e defined by the intersection of initial bounding volume 120 and first bounding volume 130. In embodiments of the invention in which initial and first coordinate systems 121 and 131 share a common axis and origin, the task of generating modified bounding volume 140 is essentially reduced to two dimensions thereby significantly simplifying the process. Utilizing known line clipping techniques in two dimensions, modified bounding volume 140 can be generated by designating initial bounding volume 120 as a clipping volume, eliminating portions of first bounding volume 130 that lie exterior to initial bounding 120, and extending the modified bounding volume in the z-dimension from the minimum and maximum z values of graphic primitive 118. (Because of the shared z-axis in the embodiment described, the maximum and minimum z values of graphic primitive 118 are common to both initial coordinate system 121 and first coordinate system 131). Because modified bounding volume 140 is determined by intersecting initial bounding volume 120 and first bounding volume 130, the cross sectional area of modified bounding volume 140 is guaranteed to be less than or equal to the cross sectional area of either initial bounding volume 120 or first bounding volume 130. In other words, modified bounding volume 140 provides a tighter fit around graphic primitive 118 than initial bounding volume 120 or first bounding volume 130. Moreover, this tighter fit is achieved without significantly increasing the complexity of the bounding volume. In the example depicted in FIG. 4 for instance, modified bounding volume 140 includes just five vertices in the x-y plane (for a total of ten vertices in three dimensions), which is only slightly more complex than the four vertices (for a total of eight) of initial and first bounding volumes 120 and 130. Upon reflection, it will be appreciated that the intersection of coplanar rectangles can result in no more than eight vertices. Thus, in the worst case, the modified bounding volume produced by method described will have at most 16 vertices, regardless of the complexity of graphic primitive 118.

Figure 6:
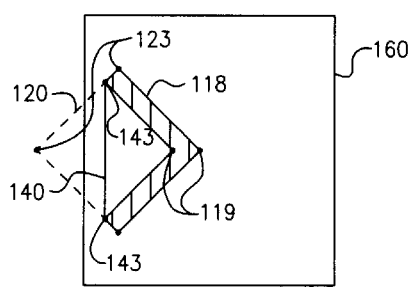
FIG. 6 is a diagram of the graphic primitive within a viewing volume illustrating the benefit of incorporating a modified bounding volume to reduce the probability of failing to detect a trivial accept.

The benefit achieved by producing generating modified bounding volume 140 is represented pictorially in FIG. 6., in which a cross sectional view of graphic primitive 118 located within a viewing volume 160 is shown. Prior to rendering graphic primitive 118, graphics applications must determine if any portion of graphic primitive 118 must be clipped or excluded from viewing volume 160, such as when a portion of graphic primitive 118 extends beyond the boundaries of viewing volume 160. As mentioned previously, one method of determining whether graphic primitive 118 lies within viewing volume 160 is to check every vertex 119 of graphic primitive 118 against the boundaries of viewing volume 160. While this process would be relatively manageable for the simple primitive 118 presented in the figures, it would quickly become excessively time consuming for a graphic primitive of any significant complexity. This is especially true since the process of comparing a primitive 118 against a viewing volume 160 is, as a general rule, performed multiple times for each graphic primitive. A beneficial compromise between checking every vertex 119 of primitive 118 and relying on a simplistic bounding volume, such as initial or first bounding volumes 120 and 130, to approximate graphic primitive 118 is provided by the present invention. More specifically, modified bounding volume achieves a more accurate approximation of graphic primitive 118 without significantly increasing the complexity of the comparison process. In the example of FIG. 6, it will be appreciated that a routine attempting to determine whether primitive 118 is within viewing volume 160 by checking the vertices 123 of initial bounding volume 120 will fail to recognize that primitive 118 lies entirely within viewing volume 160. This failure will force the routine to check each vertex 119 of primitive 118 against the boundaries of viewing volume 160. In the case of a primitive significantly more complex than primitive 118 as depicted, the execution time required to perform this tedious check process can be considerable. Using modified bounding volume 140, the probability of failing to detect a trivial accept or reject of a graphic primitive 118 is beneficially reduced. Because modified bounding volume 140 in the example depicted in FIG. 6 lies entirely within viewing volume 160, a checking routine will successfully recognize that graphic primitive 118 may be trivially accepted as lying entirely within viewing volume 160 This benefit is achieved with an upper bound on the increase in time consumed by the checking routine. In other words, because a modified bounding volume generated as described in this embodiment of the invention may include no more than 16 vertices, an upper limit is placed on the time required to check the modified bounding volume.

Turning now to FIG. 14, a presently preferred method 240 of generating a modified bounding volume according to the invention is presented. In the preferred embodiment, method 240 generally occurs during the generation or creation of a graphic primitive such that the modified bounding volume produced by method 240 is available each time an application or routine checks the primitive for trivial acceptance or rejection. In step 242, variables representing maximum and minimum values for x, y, x', and y' are declared and initialized (to 0, for example). Steps 244, 246, and 248 are executed as a loop that is iterated for each vertex of a graphic primitive. In step 244, the x and y values (in the initial coordinate system) of the vertex currently under consideration are compared with the maximum and minimum x and y values. If the values of the current vertex exceed the maximum or minimum values, the corresponding maximum or minimum values are adjusted accordingly. (For purposes of this disclosure, a maximum value is exceed if the current value is greater than the maximum value while a minimum value is exceed if the current value is less than the minimum value). In step 246, the x' and y' coordinates, relative to the first coordinate system, of the current vertex are calculated.

In an embodiment in which the first coordinate system is rotated through an angle α with respect to the initial coordinate system about a common z-axis, the x' and y' coordinates of the current vertex are determined by rotating the current vertex through an angle α. The x and y values (relative to the initial coordinate system) of the rotated vertex represent the x' and y' coordinates of the vertex with respect to the first coordinate system. The rotation of each vertex to determine the x' and y' values is simulated by applying the trigonometric relationships between the x, y coordinates of a vertex relative to the initial coordinate system and the x', y' coordinates of the vertex relative to the first coordinate system. (The trigonometric relationships are indicated in FIG. 5). These x' and y' value of the current vertex are then compared with x' and y' maximum and minimum values. If the current x' and y' values exceed the x' and y' maximum or minimums, the corresponding maximums or minimums are adjusted appropriately.

Figure 15A:
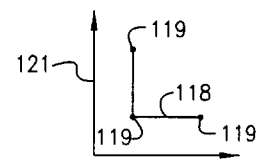
FIG. 15 is a graphical representation, presented in three diagrams, of the method of FIG. 14.
Figure 15B:
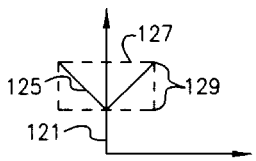
Figure 15C:
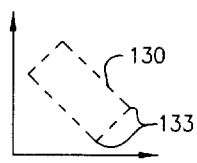

After each vertex of a given primitive has been subjected to the described procedure, the initial bounding volume is defined by the maximum and minimum x and y values in step 250. These four maximum and minimum values determine the four vertices of the initial bounding volume. If, for example, xmin=6, xmax=8, ymin=1, and ymax=9, the four vertices of the initial bounding volume would be (6,1), (6,9), (8,1), and (8,9). Similarly, the first bounding volume is defined by the four vertices corresponding to x' min, x' max, y' min, and y' max in step 252. The first bounding volume is then "untransformed" in step 254 by applying the inverse of the transformation the produces the first coordinate system from the initial coordinate system. This reverse transformation process is necessary to bring the first bounding volume into a common coordinate system with the initial bounding volume so that the two bounding volumes may be intersected to produce the modified bounding volume. In embodiments in which the first transformation includes rotating the initial coordinate system through an angle α about an axis of the initial coordinate system, the inverse transformation would include rotating through an angle −α about the same axis. Thus, in the presently preferred embodiment, each of the four vertices defined by x' and y' maximum and minimum, are rotated through an angle −α about the z-axis. The first bounding volume is defined by these "unrotated" vertices in step 256. The process of generating the first bounding volume, therefore, may be described as a process in which a first transformation is applied to a graphic primitive by transforming each vertex of the graphic primitive. A transformed bounding volume is then defined by the maximum and minimum values of the transformed graphic primitive. Finally, a reverse first transformation is applied to the transformed bounding volume by reverse transforming each vertex of the transformed bounding volume to produce the first bounding volume that is to be intersected with the initial bounding volume. This process is depicted graphically in the three diagrams of FIG. 15. In FIG. 15a, graphic primitive 118 is shown in relation to initial coordinate system 121. The first transformation (comprised of a 45° rotation about the origin in the depicted embodiment) is then applied to graphic primitive 118 by transforming each vertex 119 of primitive 118 to produce the transformed graphic primitive 125 depicted in FIG. 15b. A transformed bounding volume 127 is then defined by the maximum and minimum x and y values (relative to initial coordinate system 121) of the transformed graphic primitive 125. The boundaries of transformed bounding volume 127 are defined by transformed vertices 129. Transformed bounding volume 127 is then untransformed by applying the inverse transformation (comprised in this case of a −45° rotation about the origin) to each transformed vertex 129 to produce the first bounding volume 130 defined by first bounding volume vertices 133 as shown in FIG. 15c. Returning now to FIG. 14, the modified bounding volume is defined in step 258 by determining the intersection of the initial bounding volume and the first bounding volume. After the vertices of the modified bounding volume have been defined, they may be subsequently used each time it is desired to determine whether the graphic primitive may be trivially rejected or accepted with respect to a specified viewing volume.

Figure 7:
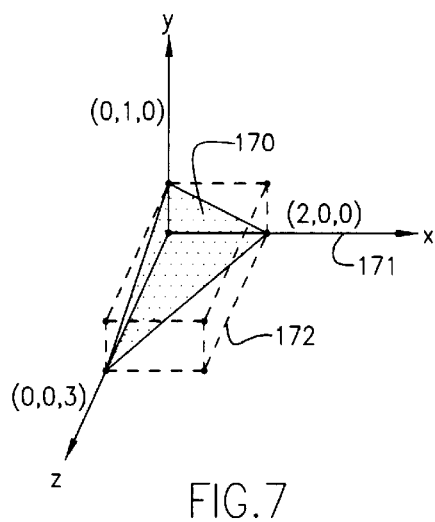
FIG. 7 is a first perspective view of a graphic primitive and an initial bounding volume.
Figure 8:
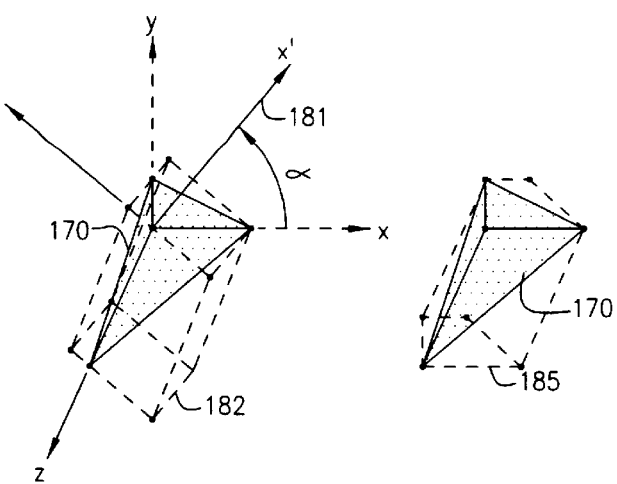
FIG. 8 is a perspective view of the graphic primitive and its first bounding volume defined by the graphic primitive's maximum and minimum values relative to a first coordinate system.
Figure 9:
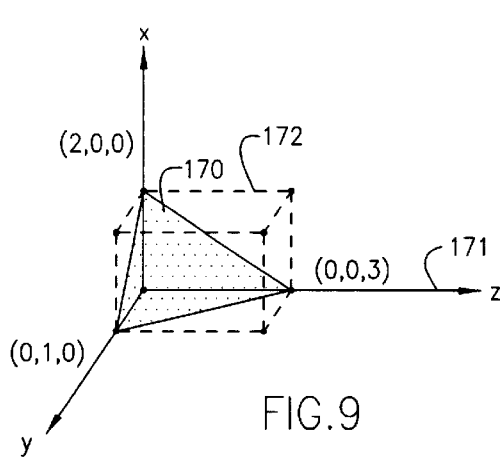
FIG. 9 is a second perspective view of a graphic primitive and the initial bounding volume.
Figure 10:
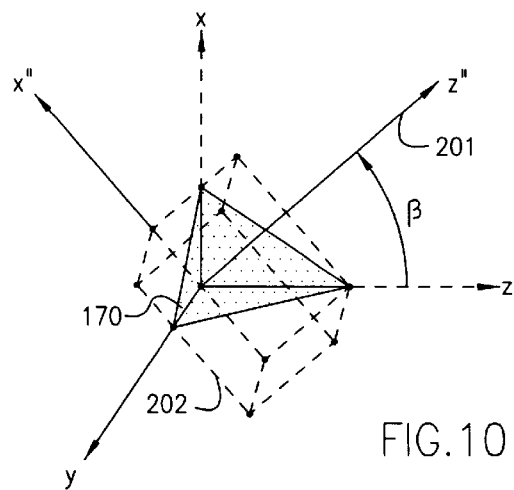
FIG. 10 is a perspective view of the graphic primitive and its second bounding volume defined by the graphic primitive's maximum and minimum values relative to a second coordinate system.
Figure 11:
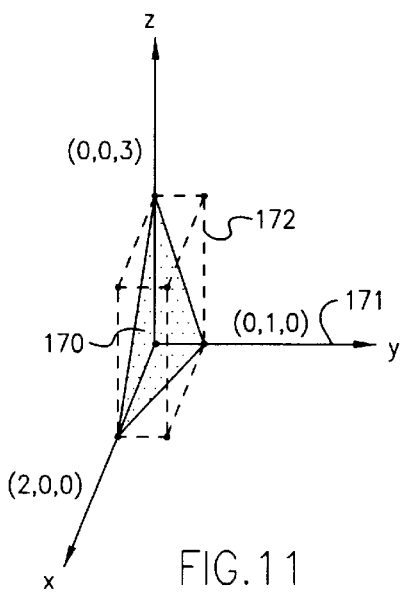
FIG. 11 is a third perspective view of a graphic primitive and the initial bounding volume.
Figure 12:
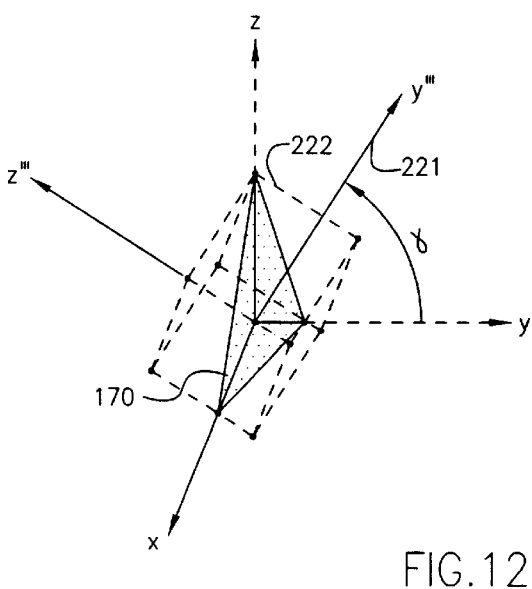
FIG. 12 is a perspective view of the graphic primitive and its third bounding volume defined by the graphic primitive's maximum and minimum values relative to a third coordinate system.

Turning now to FIGS. 7 through 12, an extension of the invention as described previously is depicted in which two or more modified bounding volumes are produced for each graphic primitive to achieve even greater accuracy in the results of a trivial acceptance/rejection check. In FIG. 7, an initial bounding volume 172 for a graphic primitive 170 is generated relative to an initial coordinate system 171 in the manner described previously. In FIG. 8, a first bounding volume 182 for graphic primitive 182 is produced relative to a first coordinate system 181, also as described previously, where first coordinate system 181 is rotated through an angle α relative to initial coordinate system 171 about a common z-axis. In the presently preferred embodiment, a suitable angle for angle α is 45°. First bounding volume 182 is then intersected with initial bounding volume 172 to produce a first modified bounding volume 185 in the manner described previously. It will be appreciated that first modified bounding volume 185 achieves a better approximation of graphic primitive 170 in the x-y plane than either initial bounding volume 172 or first bounding volume 182. To achieve a similar result in the z-x plane and the y-z plane, second and third modified bounding volumes are generated in one embodiment of the invention. FIG. 9 presents graphic primitive 170, initial bounding volume 172, and initial coordinate system 171, all as presented in FIG. 7, but viewed from an orientation in which the z-x plane is parallel to the drawing sheet. In FIG. 10 a second bounding volume 202 is generated relative to a second coordinate system 201, wherein second coordinate system 201 is rotated through an angle β relative to initial coordinate system 171 about a common y-axis. A second modified bounding volume (not depicted) is then produced by intersecting initial bounding volume 172 and second bounding volume 202. It will be appreciated that the second modified bounding volume produced by intersecting initial bounding volume 172 and second bounding volume 202 achieves a better or more accurate approximation of graphic primitive 170 in the z-x plane than either initial bounding volume 172 or second bounding volume 202. Second bounding volume 202 is preferably generated during creation of graphic primitive 170 using a variation of the method described with respect to FIG. 14 for generating the first bounding volume. In this variation, the second bounding volume is achieved by rotating each vertex of graphic primitive 170 through an angle β about the y axis using trigonometric functions analogous to those indicated in FIG. 5 to produce z" and x" values for each vertex, adjusting z" and x" maximum and minimum values accordingly as each rotated vertex is considered, defining second bounding volume vertices by the final maximum and minimum z" and x" values, and reverse rotating these second bounding volume vertices about the y-axis through an angle −β. Continuing in this manner, one embodiment of the invention contemplates generating a third modified bounding volume. A third modified bounding volume is preferably produced by intersecting initial bounding volume 170 as shown in FIG. 11 (from a perspective in which the y-z plane is parallel to the drawing sheet) with a third bounding volume 222 where third bounding volume 222 is defined by maximum and minimum y'" and z'" values of graphic primitive 170 with respect to a third coordinate system 221. In the preferred embodiment, the third coordinate system 221 is rotated through an angle γ (preferably 45°) with respect to initial coordinate system 171 about a common x-axis. The third modified bounding volume (not depicted) produced by the intersection of initial bounding volume 172 and third bounding volume 222 produces a more accurate approximation of graphic primitive 170 in the y-z plane. Third bounding volume 222 is suitably produced using a procedure equivalent to the procedures used to generate first bounding volume 182 and second bounding volume 202, except that third coordinate system 221 is rotated about a common x-axis with respect to initial coordinates system 171 as opposed to the common z-axis used to produce first bounding volume 182 and the common y-axis used to produced second bounding volume 202. In embodiments of the invention employing multiple modified bounding volumes as described, a trivial accept/reject test may include a separate trivial accept/reject test for each modified bounding volume. If any of the modified bounding volumes may be trivially rejected or accepted, then graphic primitive 170 is trivially rejected or accepted accordingly and additional checking is unnecessary.

Turning now to FIG. 13, a graphic display system 230 according to the invention is presented. Display system 230 preferably includes one or more processors 232 coupled to a processor or host bus 234. A bridge/memory controller 236 provides a path between host bus 234 and a system memory 238 as well as a path between host bus 234 and a peripheral bus 242. Processor 232 may comprise any of a variety of industry standard or application specific RISC or CISC chips and the current invention does not contemplate restricting the choice of processor 232 to any particular implementation. Multi-processor embodiments of display system 230 are indicated by the presence of the additional processors shown in dashed lines. In one embodiment, peripheral bus 242 is a PCI bus or other bus suitable for supporting high performance graphics applications and hardware. In the depicted embodiment, system memory 238 includes a dual ported frame buffer portion 240 that may be accessed either directly by a video controller 248 or by processor 232 through bridge 236. A graphics adapter 244 is coupled to peripheral bus 244 and may preferable include a local memory portion 246. Video controller 248 is coupled to a display device 250 and is configured to refresh display 250 with a graphic image stored in frame buffer 240. Graphics adapter 244 may be suitably integrated in a single device with video controller 248. In the preferred embodiment, display system 230 includes a storage medium such as system memory 238 or local memory 246 of graphics adapter 244 that is configured with a set of instructions or a routine for constructing one or more modified bounding volumes, in the manner discussed previously, as a graphic primitive is generated. In alternative embodiments that storage medium may include a hard disk coupled to peripheral bus 242, a CD ROM, a floppy diskette, a compact flash memory card or any other suitable storage medium. In the preferred embodiment, these instructions include, at a minimum, instructions for defining initial bounding volume by the graphic primitive's maximum and minimum x, y, and z coordinates relative to an initial coordinate system, defining a first bounding volume by the graphic primitive's maximum and minimum x', y', and z' coordinates in a first coordinate system that is transformed, preferably through rotation, from the initial coordinate system, and determining the intersection of the initial bounding volume and the first bounding volume to produce a modified bounding volume. This modified bounding volume is then preferably saved as data associated with a graphic primitive and used during subsequent processing to determine relatively quickly and relatively accurately whether the graphic primitive may be trivially accepted or rejected with respect to a specified viewing volume by comparing the vertices of the modified bounding volume against the boundaries of the viewing volume. The computer instructions or routines that create the modified bounding volume may comprise an extension of an industry standard interface for graphics hardware such as the OpenGL standard. In other embodiments, the routines may be suitably embedded within an application program. The program may include options or extensions for producing additional modified bounding volumes using additional sets of transformed coordinate systems as described previously.

It will be apparent to those skilled in the art having the benefit of this disclosure that the present invention contemplates a method for generating a bounding volume for a graphic primitive that reduces the probability of failing to detect a trivial accept or reject condition. It is understood that the form of the invention shown and described in the detailed description and the drawings are to be taken merely as presently preferred examples. It is intended that the following claims be interpreted broadly to embrace all the variations of the preferred embodiments disclosed.

What is claimed is:

1. A method of testing a graphic primitive for trivial acceptance or rejection, comprising:

defining an initial bounding volume by the graphic primitive's maximum and minimum x, y, and z coordinates in an initial coordinate system;

defining a first bounding volume by the graphic primitive's maximum and minimum x', y', and z' coordinates in a first coordinate system, wherein the first coordinate system is determined by applying a first transformation to the initial coordinate system;

intersecting the initial bounding volume and the first bounding volume to form a modified bounding volume;

determining the graphic primitive's relationship to a predetermined viewing volume by determining the modified bounding volume's relationship to the viewing volume, wherein the graphic primitive is trivially accepted if the modified bounding volume is within the viewing volume and wherein the graphic primitive is trivially rejected if the modified bounding volume is exterior to the viewing volume; and rendering the graphic primitive in a graphic display system if the primitive was trivially accepted.

2. The method of claim 1, wherein the initial and first bounding volumes comprise rectangular parallelepipeds.

3. The method of claim 1, wherein the step of defining the first bounding volume comprises:

applying the first transformation to the graphic primitive to produce a transformed graphic primitive;

defining a transformed bounding volume by maximum and minimum x, y, and z values of the transformed graphic primitive in the initial coordinate system, wherein the transformed bounding volume comprises a plurality of transformed vertices; and applying an inverse of the first transformation to each of the plurality of transformed vertices.

4. The method of claim 1, wherein the initial coordinate system and the first coordinates system share a first common axis and further wherein the first transformation comprises a first rotation about the first common axis.

5. The method of claim 4, wherein an angle of the first rotation is 45°.

6. The method of claim 1, further comprising:

defining a second modified bounding volume by intersecting the initial bounding volume with a second bounding volume defined by the graphic primitive's maximum and minimum x", y", and z" values in a second coordinate system determined by applying a second transformation to the initial coordinate system; and trivially accepting the graphic primitive if the second modified bounding volume is within the viewing volume and trivially rejecting the graphic primitive if the second modified bounding volume is exterior to the viewing volume.

7. The method of claim 6, wherein the second coordinate system and the initial coordinate system share a second common axis and further wherein the second transformation comprises a second rotation about the second common axis.

8. The method of claim 6, further comprising defining a third modified bounding volume by intersecting the initial bounding volume with a third bounding volume defined by the graphic primitive's maximum and minimum x''', y''', and z''' values in a third coordinate system determined by applying a third transformation to the initial coordinates system; and trivially accepting the graphic primitive if the third modified bounding volume is within the viewing volume and trivially rejecting the graphic primitive if the third modified bounding volume is exterior to the viewing volume.

9. The method of claim 8, wherein the third coordinate system and the initial coordinate system share a third common axis and further wherein the third transformation comprises a third rotation about the third common axis.

10. A computer readable storage medium configured with computer instructions for generating a bounding volume for a graphic primitive, comprising:

computer code means for defining an initial bounding volume by a graphic primitive's maximum and minimum x, y, and z coordinates in an initial coordinate system;

computer code means for defining a first bounding volume by the graphic primitive's maximum and minimum x', y', and z' coordinates in a first coordinate system, wherein the first coordinate system is determined by applying a first transformation to the initial coordinate system;

computer code means for intersecting the initial bounding volume and the first bounding volume to form a modified bounding volume;

computer code means for storing the modified bounding volume in a storage medium of a graphics display system; and computer code means for determining the graphic primitive's relationship to a predetermined viewing volume by determining the modified bounding volume's relationship to the viewing volume, wherein the graphic primitive is trivially accepted if the modified bounding volume is within the viewing volume and wherein the graphic primitive is trivially rejected if the modified bounding volume is exterior to the viewing volume.

11. The storage medium of claim 10, wherein the storage medium comprises a system memory of a graphics display system.

12. The storage medium of claim 10, wherein the code means for defining the first bounding volume comprises:

computer code means for applying the first transformation to the graphic primitive to produce a transformed graphic primitive;

computer code means for defining a transformed bounding volume by maximum and minimum x, y, and z values of the transformed graphic primitive in the initial coordinate system, wherein the transformed bounding volume comprises a plurality of transformed vertices; and computer code means for applying an inverse of the first transformation to each of the plurality of transformed vertices.

13. The storage medium of claim 10, wherein the first coordinate system and the initial coordinate system share a first common axis and further wherein the first transformation comprises a first rotation of 45° about the first common axis.

14. The storage medium of claim 10, further comprising:

computer code means for defining a second modified bounding volume by intersecting the initial bounding volume with a second bounding volume defined by the graphic primitive's maximum and minimum, x", y", and z" values in a second coordinate system determined by applying a second transformation to the initial coordinate system; and computer code means for trivially accepting the graphic primitive if the second modified bounding volume is within the viewing volume and trivially rejecting the graphic primitive if the second modified bounding volume is exterior to the viewing volume.

15. The storage medium of claim 14, further comprising:

computer code means for defining a third bounding volume defined by the graphic primitive's maximum and minimum, x''', y''', and z''' values in a third coordinate system determined by applying a third transformation to the initial coordinate system; and computer code means for trivially accepting the graphic primitive if the third modified bounding volume is within the viewing volume and trivially rejecting the graphic primitive if the third modified bounding volume is exterior to the viewing volume.

16. The storage medium of claim 15, wherein the second coordinate system and the initial coordinate system share a second common axis and wherein the second transformation comprises a 45° rotation about the second common axis, and further wherein the third coordinate system and the initial coordinate system share a third common axis and wherein the third transformation comprises a 45° rotation about the third coordinate system.

17. A graphics display system comprised of:

a system memory, including a representation of a graphic primitive;

a display processor configured to execute graphics instructions stored in the system memory to modify contents of a frame buffer, wherein the frame buffer contents include a representation of a screen image;

a display device; and a video controller capable of accessing the frame buffer and adapted to generate the screen image on the display device based on the frame buffer contents;

wherein the graphics instructions include instructions for trivially rejecting or accepting the graphic primitive comprising:

defining an initial bounding volume by the graphic primitive's maximum and minimum x, y, and z coordinates in an initial coordinate system;

defining a first bounding volume by the graphic primitive's maximum and minimum x', y', and z' coordinates in a first coordinate system, wherein the first coordinate system is determined by applying a first transformation to the initial coordinate system;

intersecting the initial bounding volume and the first bounding volume to form a modified bounding volume; and determining the graphic primitive's relationship to a predetermined viewing volume corresponding to the screen image by determining the modified bounding volume's relationship to the viewing volume, wherein the graphic primitive is trivially accepted if the modified bounding volume is within the viewing volume and the graphic primitive is trivially rejected if the modified bounding volume is exterior to the viewing volume.

18. The system of claim 17, wherein the defining of the first bounding volume comprises:

applying the first transformation to the graphic primitive to produce a transformed graphic primitive;

defining a transformed bounding volume by maximum and minimum x, y, and z values of the transformed graphic primitive in the initial coordinate system, wherein the transformed bounding volume comprises a plurality of transformed vertices; and applying an inverse of the first transformation to each of the plurality of transformed vertices.

19. The system of claim 17, wherein the graphics instructions further comprise:

defining a second modified bounding volume by intersecting the initial bounding volume with a second bounding volume defined by the graphic primitive's maximum and minimum, x", y", and z" values in a second coordinate system determined by applying a second transformation to the initial coordinate system;

trivially accepting the graphic primitive if the second modified bounding volume is within the viewing volume and trivially rejecting the graphic primitive if the second modified bounding volume is exterior to the viewing volume;

defining a third modified bounding volume by intersecting the initial bounding volume with a third bounding volume defined by the graphic primitive's maximum and minimum, x''', y''', and z''' values in a third coordinate system determined by applying a third transformation to the initial coordinate system; and trivially accepting the graphic primitive if the third modified bounding volume is within the viewing volume and trivially rejecting the graphic primitive if the third modified bounding volume is exterior to the viewing volume.

20. The system of claim 19, wherein the second coordinate system and the initial coordinate system share a second common axis and wherein the second transformation comprises a 45° rotation about the second common axis, and further wherein the third coordinate system and the initial coordinate system share a third common axis and wherein the third transformation comprises a 45° rotation about the third coordinate system.

* * * * *